(12) United States Patent
Sim et al.

(10) Patent No.: US 10,469,843 B2
(45) Date of Patent: *Nov. 5, 2019

(54) METHOD AND APPARATUS FOR ENCODING/DECODING VIDEO BY USING PADDING IN VIDEO CODEC

(71) Applicant: KWANGWOON UNIVERSITY INDUSTRY-ACADEMIC COLLABORATION FOUNDATION, Seoul (KR)

(72) Inventors: Donggyu Sim, Seoul (KR); Seanae Park, Seoul (KR)

(73) Assignee: Kwangwoon University Industry-Academic Collaboration Foundation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/894,971

(22) Filed: Feb. 13, 2018

(65) Prior Publication Data

US 2018/0262762 A1 Sep. 13, 2018

Related U.S. Application Data

(63) Continuation of application No. 15/472,987, filed on Mar. 29, 2017, now Pat. No. 9,936,204.

(30) Foreign Application Priority Data

Mar. 8, 2017 (KR) .................. 10-2017-0029281

(51) Int. Cl.
| | |
|---|---|
| *H04N 19/147* | (2014.01) |
| *H04N 19/119* | (2014.01) |
| *H04N 19/159* | (2014.01) |
| *H04N 19/176* | (2014.01) |
| *H04N 19/593* | (2014.01) |
| *H04N 19/11* | (2014.01) |

(52) U.S. Cl.
CPC ........... *H04N 19/147* (2014.11); *H04N 19/11* (2014.11); *H04N 19/119* (2014.11); *H04N 19/159* (2014.11); *H04N 19/176* (2014.11); *H04N 19/593* (2014.11)

(58) Field of Classification Search
CPC .. H04N 19/147; H04N 19/119; H04N 19/159; H04N 19/176
USPC .................. 375/240.02, 240.12, 240.24
See application file for complete search history.

(56) References Cited

U.S. PATENT DOCUMENTS

2011/0103701 A1 5/2011 Cheon
2017/0155922 A1* 6/2017 Yoo ............... H04N 19/119

FOREIGN PATENT DOCUMENTS

| JP | 8-280032 A | 10/1996 |
|---|---|---|
| JP | 6090697 B2 | 3/2017 |
| KR | 10-2006-0123939 | 12/2006 |

OTHER PUBLICATIONS

Chen, Fangdong, "Two-Stage Picture Padding for High Efficiency Video Coding", *2016 Picture Coding Symposium (PCS)*, 2016, (5 pages in English).

* cited by examiner

*Primary Examiner* — On S Mung
(74) *Attorney, Agent, or Firm* — NSIP Law

(57) ABSTRACT

The present invention relates to a method and apparatus for encoding/decoding a video, the method being applied with a method of using video padding and removing the padded area after decoding in order to effectively encode the video in a video compression technology for a high-definition security camera.

6 Claims, 5 Drawing Sheets

FIG. 2A
FIG. 2B
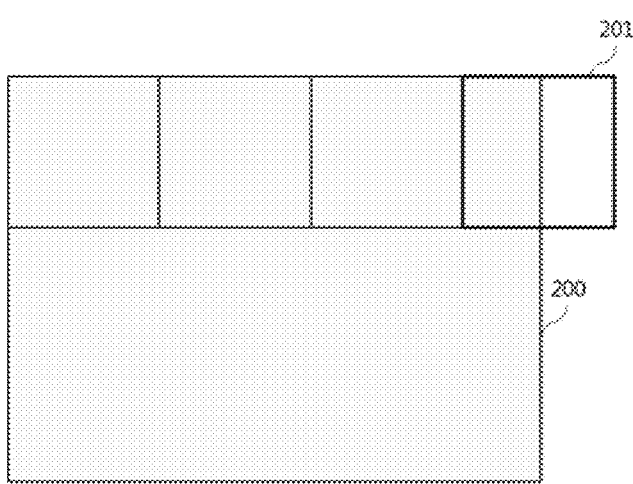
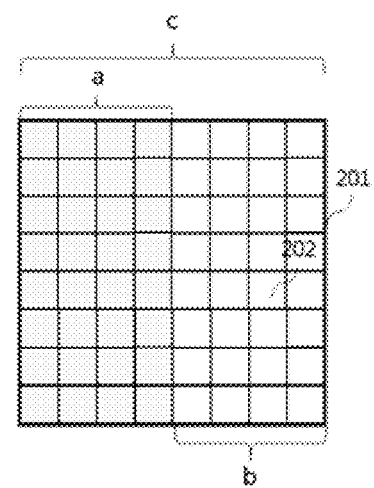

METHOD AND APPARATUS FOR ENCODING/DECODING VIDEO BY USING PADDING IN VIDEO CODEC

CROSS REFERENCE TO RELATED APPLICATIONS

This application is a continuation of application Ser. No. 15/472,987 filed on Mar. 29, 2017, now U.S. Pat. No. 9,936,204 issued on Apr. 3, 2018, which claims the benefit under 35 USC 119(a) of Korean Patent Application No. 10-2017-0029281, filed Mar. 8, 2017, in the Korean Intellectual Property Office, the entire disclosures of which are incorporated herein by reference for all purposes.

BACKGROUND OF THE INVENTION

Field of the Invention

The present invention relates generally to video encoding and decoding technologies of a method and apparatus for compressing a high-definition video. More particularly, the present invention relates to a method and apparatus for padding a pixel value at the edge of a coding unit group so as to perform effective encoding/decoding when encoding/decoding a video.

Description of the Related Art

Recently, social anxiety caused by crime such as indiscriminate crime against unspecified people, retaliatory crime against a specific target, crime against the vulnerable in society, etc. has increased, and thus there is a need for development of various apparatuses and systems for security. Particularly, security cameras (CCTV) are utilized as evidence for a crime or are used to identify a criminal, and thus demands of the nation as well as demands for personal safety increase. However, due to the limited circumstances in transmitting or storing the obtained data, definition degradation occurs or the data is stored as low-definition video. In order to use a security camera video in various ways, a compression method capable of storing a high-definition video with low data consumption is required.

Generally, in video compression technology, video encoding/decoding is not performed on one entire video, but performed by partitioning the video into blocks having a size suitable for encoding/decoding. An encoding/decoding unit having a size suitable for video characteristics may enhance encoding performance.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a method and apparatus where when decoding a high-definition video, a decoded part of the video is not stored in a decoding buffer.

However, it should be understood that technical problem to be solved by the present invention is not limited to the aforementioned technical problem and other technical problems may be present.

In order to achieve the above object, according to one aspect of the present invention, there is provided a method and apparatus for decoding a video, the method including: receiving a bitstream from an encoding apparatus, and parsing bitstream data; decoding the parsed bitstream data; removing data that is padded during encoding, from the decoded bitstream data; and storing a decoded video where the padded data is removed at a decoded picture buffer (DPB).

According to the method of encoding/decoding a video of the present invention, the method includes: determining a minimum size of a coding block that is used in encoding the video; determining whether or not padding is performed based on comparison between the minimum size of the coding block and a size of a current block; specifying a padding target area when determining that the padding is performed; calculating a padding value for the padding target area; generating a pixel value of the padding target area based on the calculated padding value; and performing intra prediction or inter prediction for the padding target area.

According to the method of encoding/decoding a video of the present invention, the padding may be performed when the size of the current block is smaller than the minimum size of the coding block.

According to the method of encoding/decoding a video of the present invention, the padding target area may be specified based on at least one of the determined minimum size of the coding block, the size of the current block, or a position of the current block in a picture.

According to the method of encoding/decoding a video of the present invention, the calculating of the padding value for the padding target area may include: arranging pixel values of the current block in a descending order based on occurrence frequency of each of the pixel values that exist in the current block; calculating a first RDcost value by using a candidate pixel value ($\alpha_k$) that is one of the arranged pixel values; and calculating the padding value for the padding target area by comparing the first RDcost value with a predetermined threshold value.

According to the method of encoding/decoding a video of the present invention, the first RDcost value may be calculated based on the current block and the padding target area padded with the candidate pixel value, and the predetermined threshold value may be a second RDcost value calculated based on only the current block.

According to the method of encoding/decoding a video of the present invention, the calculating of the first RDcost value may be performed in an order from a pixel value with highest occurrence frequency to a pixel value with lowest occurrence frequency.

According to the method of encoding/decoding a video of the present invention, the calculating of the first RDcost value may be repeatedly performed until the first RDcost value equal to or less than the predetermined threshold value is calculated.

According to the method of encoding/decoding a video of the present invention, when the first RDcost value is equal to or less than the predetermined threshold value, the candidate pixel value used in calculating the first RDcost value is set as the padding value for the padding target area.

According to the method of encoding/decoding a video of the present invention, when the first RDcost value is larger than the predetermined threshold value, the candidate pixel value corresponding to a minimum value of the calculated multiple first RDcost values is set as the padding value for the padding target area.

In order to enhance coding efficiency, the present invention is intended to propose a method and apparatus for encoding/decoding a video, in a process of encoding/decoding block units, the method capable of padding and encoding a video in order to effectively transmit partition information of a block, and removing padded pixel information in the decoded video and storing the decoded video at a decoded picture buffer (DPB).

According to an embodiment of the present invention, partition information of a block is effectively transmitted to the decoding apparatus, thereby enhancing encoding performance.

BRIEF DESCRIPTION OF THE DRAWINGS

The above and other objects, features and other advantages of the present invention will be more clearly understood from the following detailed description when taken in conjunction with the accompanying drawings, in which:

FIGS. 2A and 2B are views showing a form of a block where padding is required according to an embodiment of the present invention;

DETAILED DESCRIPTION OF THE INVENTION

Figure 1:
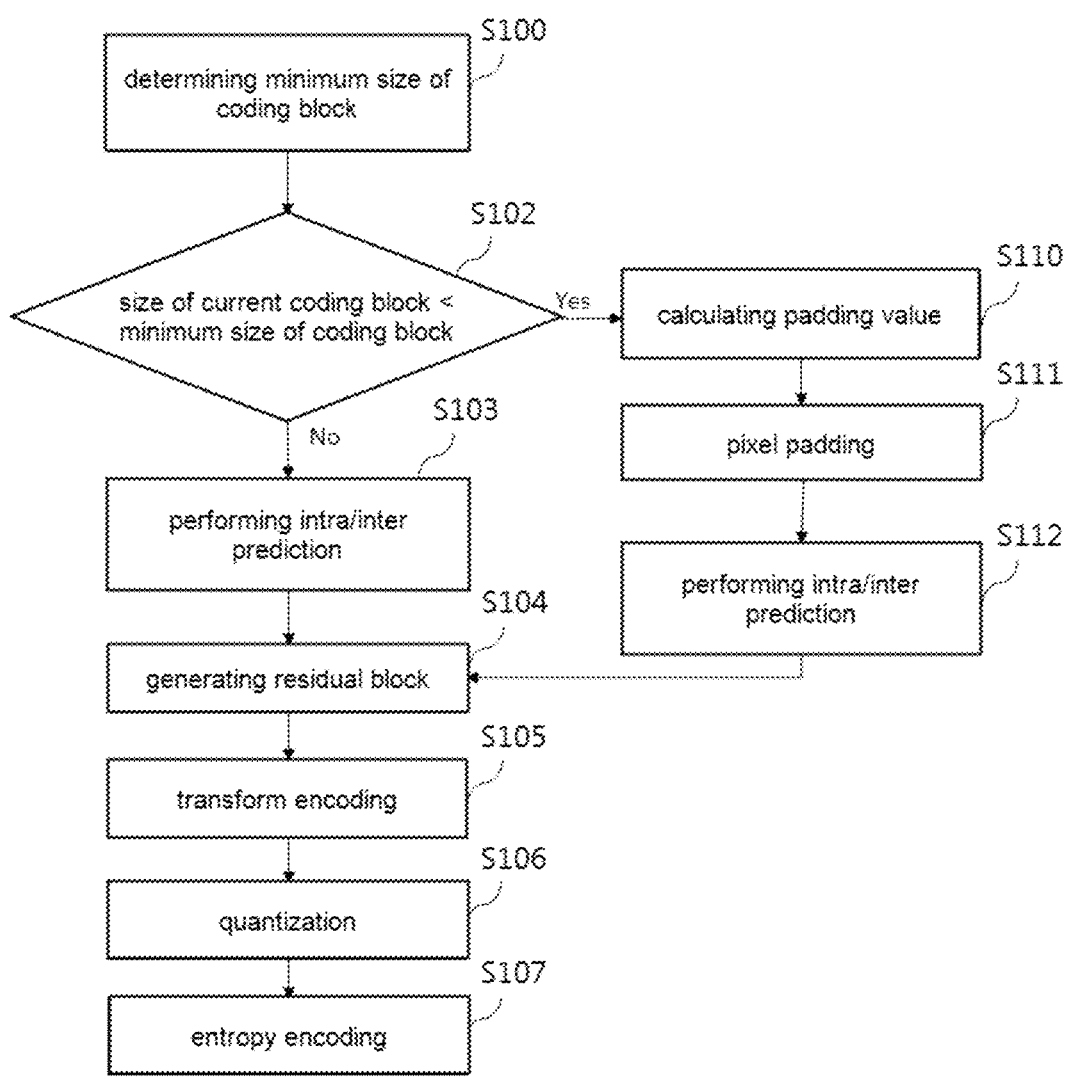
FIG. 1 is a flowchart showing an encoding method according to an embodiment of the present invention.

Hereinbelow, exemplary embodiments of the present invention will be described in detail with reference to the accompanying drawings such that the invention can be easily embodied by one of ordinary skill in the art to which this invention belongs. However, it should be understood that the embodiments may be changed to a variety of embodiments and the scope and spirit of the invention are not limited to the embodiments described hereinbelow. In addition, in order to clearly explain the present disclosure, portions that are not related to the present disclosure are omitted in the drawings, and like reference numerals are used to refer to like elements throughout the description.

Throughout the description, when an element is referred to as being "coupled" to another element, it can be directly coupled to the other element or intervening elements may be present between the elements by being electrically coupled to each other.

In addition, throughout the description, it should also be understood that when a component "includes" an element, unless there is another opposite description thereto, the component does not exclude another element but may further include the other element.

Through the whole document, the term "step of" does not mean "step for".

In addition, terms used in the specification, 'first', 'second', etc. can be used to describe various components, but the components are not to be construed as being limited to the terms. The terms are only used to differentiate one component from other components.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

First, the following definitions are provided for the terms that are used in the description.

Hereinafter, a decoding apparatus that will be described later may be an apparatus included in a private security camera, a private security system, a military security camera, a military security system, a personal computer (PC), a notebook computer, a portable multimedia player (PMP), a wireless communication terminal, a smart phone, a server terminal such as a TV application server, a service server, etc. In addition, a decoding apparatus may be an apparatus including a user terminal such as various devices, etc., a communication device such as a communication modem for communication through wired/wireless communication networks, etc., a memory for storing data and various programs for inter or intra prediction in order to encode or decode a video, a microprocessor for performing operation and control by executing programs, etc.

In addition, a video encoded as a bitstream by the encoding apparatus may be transmitted in real time or non-real time to a video decoding apparatus through a wired/wireless communication network such as internet, a near-field communication network, a wireless local area network (LAN), a WiBro network, a mobile communication network, etc. or various communication interfaces such as a cable, a universal serial bus (USB), etc. The video may be reconstructed by being decoded, and may be played.

Generally, a video may be composed of a series of pictures, and each of the pictures may be partitioned into coding units such as blocks. In addition, it is well known to a person skilled in the art that a picture may be replaced with another term having the same meaning such as an image, a frame, etc. In addition, it is well known to a person skilled in the art that a coding unit may be replaced with another term having the same meaning such as a unit block, a block, etc.

Hereinafter, embodiments of the present invention of the present invention will be disclosed in detail with reference to the accompanying drawings. In describing the present invention, repeated descriptions of the same elements will be omitted.

FIG. 1 is a flowchart showing operations of an encoding apparatus according to an embodiment of the present invention. According to the embodiment, when encoding a video, the encoding apparatus partitions one picture or one slice into coding blocks having a predetermined size, and performs encoding. Here, the encoding apparatus transmits information about the coding block to a decoding apparatus. The transmission may be performed at various levels such as a coding block, a coding block group, a picture, a slice, a tile, a picture group, a sequence, etc. according to the embodiment. In the embodiment, the encoding apparatus may transmit, at a transmission level, maximum/minimum sizes of a coding block that may be encoded. Alternatively, maximum/minimum sizes of a coding block may be defined based on a profile, etc. When transmission is required, the transmitted information may be applied to a processor corresponding to a step after encoding/decoding time at a lower level of the transmission level or a transmission step.

According to the embodiment, encoding/decoding may be selectively performed based on maximum/minimum sizes defined by a profile or on the transmitted maximum/minimum sizes. For example, when the size of a block is larger than the maximum size or smaller than the minimum size, encoding/decoding may not be performed. The encoding apparatus determines a minimum size of a coding block defined in terms of a profile or application at step S100. Next, the size of a current block may be compared with the predetermined minimum size of the coding block at step S102. Here, the current block may mean a block to be encoded currently, and may be, for example, a coding block, a prediction block, etc. The predetermined minimum size of the coding block may be a value predefined by a profile, etc. as described above, and may be transmitted through a bitstream. Pixel padding may be selectively performed based on the comparison between the size of the current block and the minimum size of a coding block. For example, when the predetermined minimum size of the coding block is larger than the size of the current block, encoding through padding may be performed.

FIGS. 2A and 2B are views showing a case where an edge pixel line of a picture is smaller than the minimum size of the coding block when one picture is partitioned into coding block units according to an embodiment of the present invention. In the embodiment of FIGS. 2A and 2B, when a minimum size of a coding block is 8×8, and a size of a current block "a" is 4×8, an absent 4×8-size block "b" is filled with predetermined values through padding. Hereinafter, the absent 4×8-size block "b" is a padding target area. The padding target area may be composed of one or more pixel lines. The padding target area may be positioned at, at least one of the top, the bottom, the left side, or the right side of the current block. The padding target area may have a square or non-square shape, and may have a geometric shape such as "┐" or "└". Through the above-disclosed method, video block data having a size of 8×8 is generated and encoding is performed. A value filling the padding target area through padding may be determined as a value that may most effectively encode to perform entropy encoding after performing prediction and quantization at step S110. Same values may be input to all pixels in a block being padded, or different values may be input to all pixels in a block being padded according to the embodiment. Pixels of the padding target area may be generated by using pixels of the current block. For example, pixels of the padding target area may be generated by copying pixels of the current block or by applying a predetermined weighting filter. Here, a pixel of the current block may be one or more pixels positioned in horizontal/vertical lines that are the same as those of pixels in the padding target area. A method of filling a video with a predetermined value by the encoding apparatus is checking whether the size of the remaining coding block is smaller than the minimum size of the coding block while performing encoding for one picture, slice, or tile. When the size of the remaining coding block is equal to or larger than the minimum size of the coding block, encoding is performed. Like the reference numeral 201 of FIG. 2A, when the size of the remaining coding block is smaller than the minimum size of the coding block, padding where a predetermined value fills the pixel 202 of the padding target area "b" is performed at step S111, and intra or inter prediction is performed at step S112. When performing intra or inter prediction, an area for calculating prediction distortion uses only values of the area "a" where pixel values exist before padding. Transform encoding, scanning, quantization, entropy coding, etc. for pixels of the padding target area may be selectively applied with consideration for coding efficiency. Next, a residual block is generated for data "c" of the coding block filled with values through padding, and transform encoding, quantization, and entropy encoding are performed, whereby a bitstream is generated.

Figure 3:
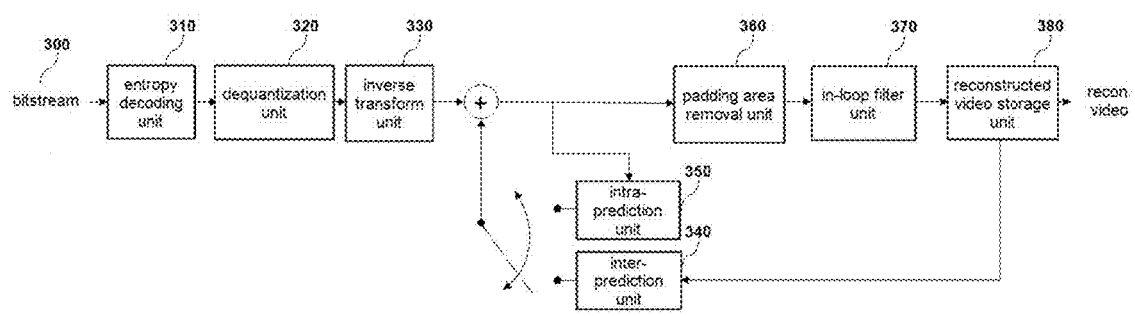
FIG. 3 is a block diagram showing a decoding apparatus according to an embodiment of the present invention.

FIG. 3 is a block diagram showing a decoding apparatus according to an embodiment of the present invention.

According to the embodiment of the present invention, the decoding apparatus may include at least one of an entropy decoding unit 310, a dequantization unit 320, an inverse transform unit 330, an inter-prediction unit 340, an intra-prediction unit 350, a padding area removal unit 360, an in-loop filter unit 370, and a reconstructed video storage unit 380.

The entropy decoding unit 310 outputs decoding information such as syntax elements and quantized coefficients, etc. by decoding an inputted bitstream 300. The output information includes various pieces of information for performing decoding. The various pieces of information include a size of a video (for example, picture) encoded in a bitstream, a coding block unit transmitted from the encoding apparatus, partition information of a coding block, size information of a transform block, size information of a prediction block, partition information of the prediction block, etc. Such information may be transmitted in various forms and units, and may be extracted from the bitstream, or may be calculated or be predicted by using information extracted from the bitstream.

The dequantization unit 320 and the inverse transform unit 330 receive a quantized coefficient and perform dequantization and inverse transform on the coefficient in order, and output a residual signal.

The inter-prediction unit 340 performs motion compensation based on a motion vector and a reconstructed video stored in the reconstructed video storage unit 380, whereby a prediction signal is generated. The motion vector may be calculated by using a prediction motion vector derived from the decoding apparatus and a differential motion vector extracted from the bitstream. The intra-prediction unit 350 performs spatial prediction based on a pixel of a pre-decoded neighbor block adjacent to the current block, whereby a prediction signal is generated.

The prediction signals output from the inter-prediction unit 340 and the intra-prediction unit 350 are added to the residual signal, and a reconstructed video that is generated through the addition is output to the padding area removal unit 360. The padding area removal unit 360 may determine whether the decoded current block is a block encoded through padding, based on at least one of the size or location of the decoded current block. For example, when the size of the received decoded block is larger than the size of a block to be originally decoded, namely, when the size of the decoded block is larger than the size of an area to be originally decoded, the decoding apparatus may determine that the current block is a block encoded through padding. Like the reference numeral 201 of FIGS. 2A and 2B, the grey area of the reference numeral 201 is an area to be originally decoded. When the decoded block is the entire area C of the reference numeral 201, it is determined that the area B is encoded through padding by the encoding apparatus, and the area B is removed. Next, the in-loop filter unit 370 may perform in-loop filtering on the reconstructed video where the padding area is removed. The reconstructed video storage unit 380 may store at least one of the reconstructed video to which in-loop filtering is applied, the reconstructed video to which in-loop filtering is not applied, or the reconstructed video where the padding area is not removed. The video stored in the reconstructed video storage unit 380 may be used as a reference picture by the inter-prediction unit 340, or may be referred to for intra prediction of the intra-prediction unit 340.

Figure 4:
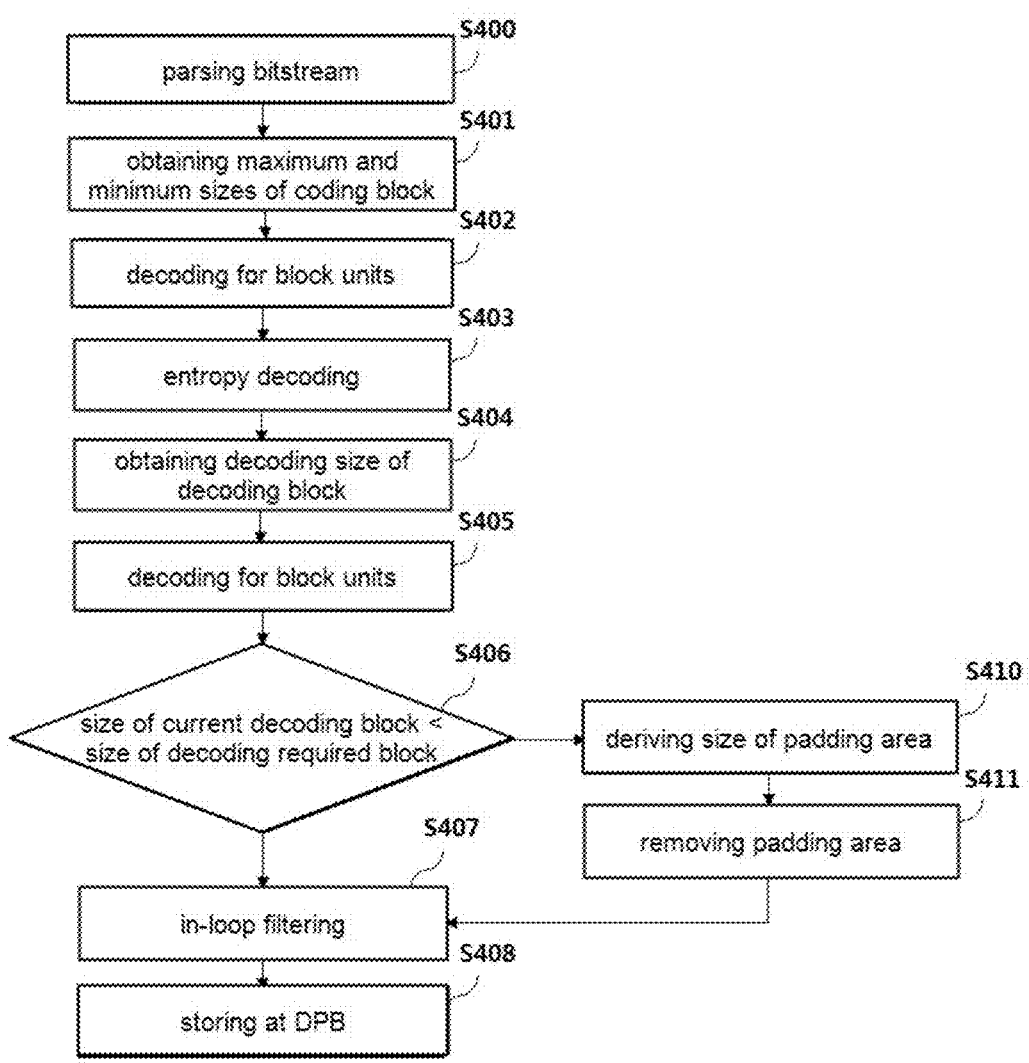
FIG. 4 is a flowchart showing a method of decoding block units according to an embodiment of the present invention.

FIG. 4 is a flowchart showing a method of decoding block units that is performed by the decoding apparatus according to an embodiment of the present invention.

The decoding apparatus parses data from the bitstream transmitted from the encoding apparatus at step S400, and obtains a unit of a coding unit, partition information of the coding unit, size information of a transform block, size information of a prediction block, partition information of the prediction block, etc. by decoding the parsed data, and performs decoding by using those. The decoding apparatus may extract or derive video information for a block by decoding block units at step S401. By using size information of a coding unit group that is derived as described above or transmitted, the decoding apparatus may predict size information of a portion that is not yet decoded in the coding unit group where decoding is ongoing. In addition, entropy decoding is performed based on such information, and encoding size information of the block being decoded now may be extracted or derived. In addition, decoding is performed by block units of the block, and it is determined whether the encoding apparatus performs padding on the block, through comparison between the size of the decoded block and the size of the portion that is not yet decoded in the coding unit group at step S406. In addition, the size of the padded area may be derived at step S410. Through step S406, when determining that the encoding apparatus performs padding on the block, the decoding apparatus removes the padded data area. Next, in-loop filtering is performed at step S407, and the result thereof is stored at a decoded picture buffer (DPB).

Figure 5:
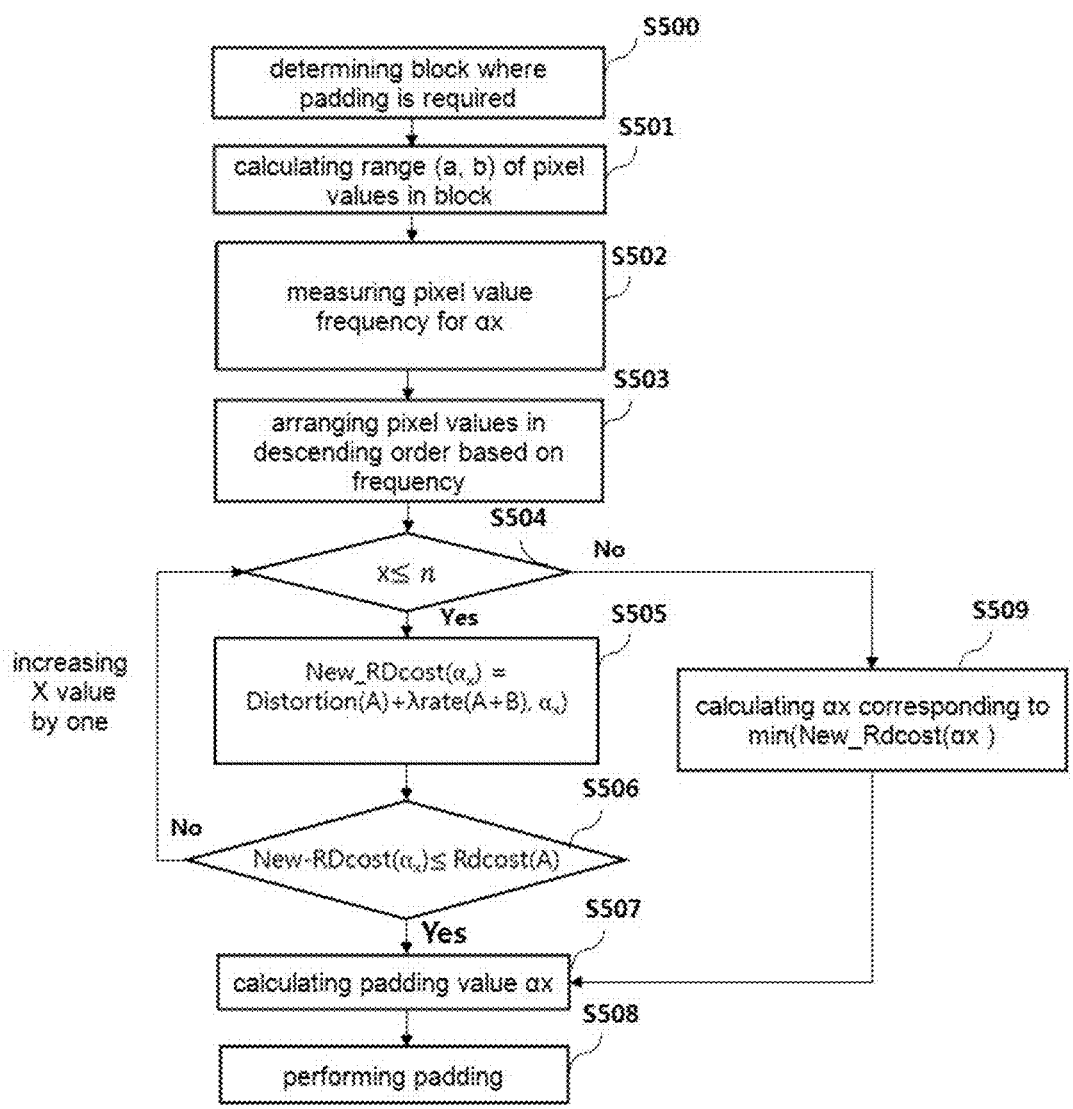
FIG. 5 is a flowchart showing a method of determining a padding area and a padding value according to an embodiment of the present invention.

FIG. 5 is a flowchart showing a method of determining a padding area and a padding value when performing encoding according to an embodiment of the present invention. FIG. 5 is a view showing step S110 of FIG. 1 in detail. When determining that a coding block requires padding at step S102, the encoding apparatus calculates a range of pixel values of the area A where the pixel values exist in the coding block of FIG. 2B. A pixel value frequency for the pixel values that exist equal to or more than once within the range is measured at step S502. The pixel values are arranged in a descending order based on the measured frequency at step S503. In addition, by using the pixel value with the highest frequency, padding is performed on the area where padding is required due to absence of pixel values, namely, the area B of FIG. 2B, and New_RDcost is calculated. In New_RDcost, Distortion is calculated only for the area A, and rate is calculated for the entire area C by using the value padded to the area B. When the calculated New_RDcost is equal to or less than RDcost calculated only for the area A, an early completion condition is satisfied and thus the corresponding pixel value is determined as $\alpha_x$ and padding is performed without encoding a block padded with other pixel values. The method of performing prediction and encoding thereafter is disclosed in the detail description of FIG. 1, and thus the description of the method is omitted. When the condition of step S506 is not satisfied with the pixel values having occurrence frequency equal to or more than once within the range, New_RDcost is calculated by using all pixel values within the range calculated at step S501. Next, a padding value is determined as $\alpha_x$ corresponding to the smallest New_RDcost, and padding is performed.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of decoding a video, the method comprising:
receiving a bitstream including information on a minimum size of a coding block that is used in decoding the video;
reconstructing the minimum size of the coding block by decoding the information on a minimum size of the coding block;
determining whether or not padding is performed based on comparison between the minimum size of the coding block and a size of a current block;
specifying a padding target area in response to determining that the padding is being performed;
calculating a padding value for the padding target area based on an occurrence frequency of each of pixel values in the current block;
generating a pixel value of the padding target area based on the calculated padding value; and
performing intra prediction or inter prediction for the padding target area,
wherein the calculating of the padding value for the padding target area comprises
arranging the pixel values in the current block in a descending order based on the occurrence frequency,
calculating a first Rate-Distortion cost (RDcost) value by using a candidate pixel value ($\alpha k$) that is one of the arranged pixel values, wherein the first RDcost value is calculated based on the current block and the padding target area added with the candidate pixel value,
comparing the first RDcost value with a second RDcost value, the second RDcost value being calculated based on only the current block, and
determining, based on a result of the comparison, whether to set the padding value as the candidate pixel value, the padding value being set as the candidate pixel value in response to the first RDcost value being equal to or less than the second RDcost value,
wherein in response to the first RDcost value being larger than the second RDcost value, the steps for calculating the padding value repeatedly performed in an order from a pixel value with a highest occurrence frequency to a pixel value with a lowest occurrence frequency, until the first RDcost value equal to or less than the second RDcost value is found, and
wherein the candidate pixel value is set to a candidate pixel value corresponding to when the first RDcost value equal to or less than the second RDcost value is found.

2. The method of claim 1, wherein the padding is performed only in response to the size of the current block being smaller than the minimum size of the coding block.

3. The method of claim 2, wherein the padding target area is specified based on at least one of the determined minimum size of the coding block, the size of the current block, or a position of the current block in a picture.

4. A method of encoding a video, the method comprising:
determining a minimum size of a coding block that is used in encoding the video;
determining whether or not padding is performed based on comparison between the minimum size of the coding block and a size of a current block;

specifying a padding target area in response to determining that the padding is being performed;
calculating a padding value for the padding target area based on an occurrence frequency of each of pixel values in the current block;
generating a pixel value of the padding target area based on the calculated padding value;
performing intra prediction or inter prediction for the padding target area to generate a prediction block; and
generating a residual block based on the prediction block and the current block,
wherein the calculating of the padding value for the padding target area comprises
arranging the pixel values in the current block in a descending order based on the occurrence frequency,
calculating a first Rate-Distortion cost (RDcost) value by using a candidate pixel value ($\alpha k$) that is one of the arranged pixel values, wherein the first RDcost value is calculated based on the current block and the padding target area added with the candidate pixel value,
comparing the first RDcost value with a second RDcost value, the second RDcost value being calculated based on only the current block, and
determining, based on a result of the comparison, whether to set the padding value as the candidate pixel value, the padding value being set as the candidate pixel value in response to the first RDcost value being equal to or less than the second RDcost value,
wherein in response to the first RDcost value being larger than the second RDcost value, the steps for calculating the padding value repeatedly performed in an order from a pixel value with a highest occurrence frequency to a pixel value with a lowest occurrence frequency, until the first RDcost value equal to or less than the second RDcost value is found, and
wherein the candidate pixel value is set to a candidate pixel value corresponding to when the first RDcost value equal to or less than the second RDcost value is found.

5. The method of claim 4, wherein the padding is performed only in response to the size of the current block being smaller than the minimum size of the coding block.

6. The method of claim 5, wherein the padding target area is specified based on at least one of the determined minimum size of the coding block, the size of the current block, or a position of the current block in a picture.

\* \* \* \* \*